United States Patent Office 2,917,741
Patented Dec. 15, 1959

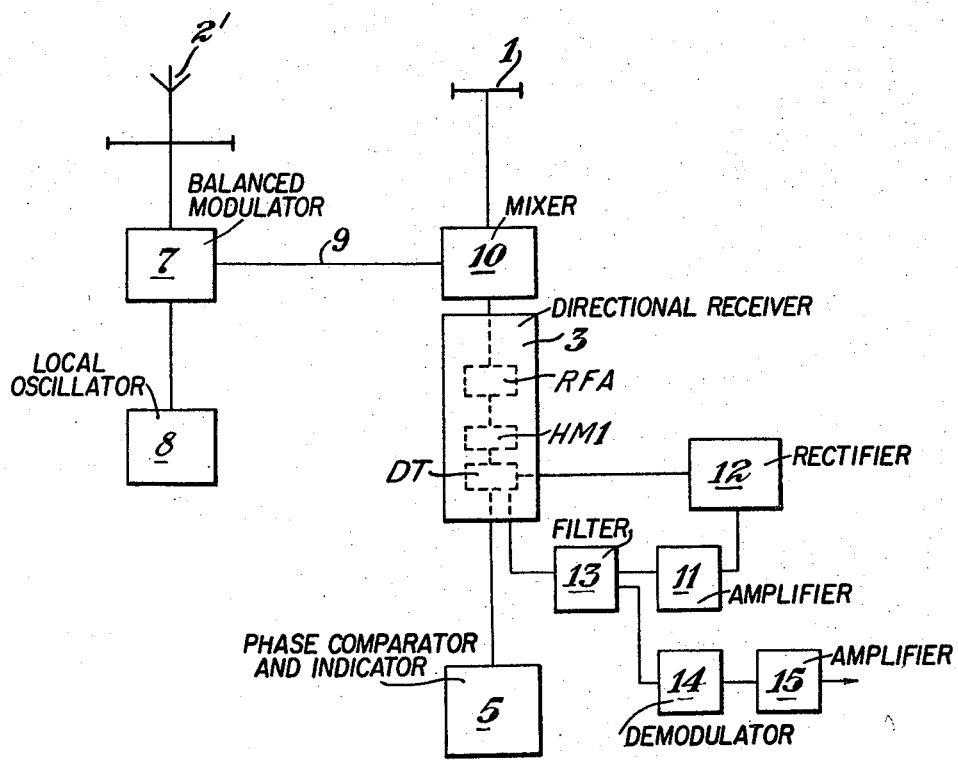

2,917,741

RADIO DIRECTION FINDERS

Sidney Arthur Walter Jolliffe, Malden, Dennis William George Byatt, Chignal, Chelmsford, David William Watson, Great Baddow, Chelmsford, James Frederick Hatch, Hutton, and Gilbert Arthur French, Chelmsford, England, assignors to Marconi's Wireless Telegraph Company Limited, London, England, a company of Great Britain Application September 8, 1953, Serial No. 378,972

Claims priority, application Great Britain September 12, 1952

2 Claims. (Cl. 343—113)

This invention relates to radio direction finders of the kind in which the direction of an incoming signal is determined by a directional aerial designed to receive signals of predetermined plane polarization, for example a crossed H Adcock aerial. An important though not exclusive application of the invention is to automatic direction finders i.e. to direction finders which automatically indicate the direction of an incoming signal without having to be oriented manually on that signal, incorporating an aerial (which term is herein employed to include an aerial system) adapted to receive signals of predetermined polarization and wherein the direction finding receiver is provided with automatic gain control (A.G.C.) and an indicator adapted to indicate whether or not the received signal strength is sufficient for reliable bearing observation.

A radio direction finder in which direction determination is effected by directional aerial, such as a crossed H Adcock aerial which is designed for a particular polarization will, in fact, respond to some extent to incoming waves of other than the correct polarization and if this happens very substantial bearing errors may result. Consider for example a typical known automatic radio direction finder which comprises a crossed H Adcock or other aerial designed to receive signals of predetermined plane polarization and which feeds into a modulating device such as a radio goniometer having a continuously rotated rotor the output of which is combined with the output from an omni-directional receiving aerial or its equivalent. The directional polar diagram of such an automatic direction finder is, of course, a limacon diagram. In effect the result achieved is a modulation of a radio frequency carrier with the phase of the modulation a function of the direction of the arrival of the incoming signal. This modulation is filtered out from the receiver output and applied to a phase detection circuit where it is compared with a reference phase to obtain the direction of the incoming signal direction, the output of the phase detection circuit being fed to a suitable display device e.g. a meter or a cathode ray tube. Such an automatic radio direction finder may be required to be used for signals coming from greatly different distances and from stations of greatly different strengths and, in ordinary operation, the field strength on the receiving aerial may be expected to vary over a range of about 80 db. Accordingly the receiver is usually equipped with A.G.C. to ensure that the modulation frequency at the receiver output is automatically maintained at a reasonably constant level e.g. within 3 db of a predetermined value. It is also customary to provide a strength indicator for indicating whether or not the incoming signal strength is sufficient for reliable observation of a bearing, the minimum acceptable signal strength for this purpose being usually only a few micro-volts. Such a strength indicator may take any of a variety of forms—for example an indicator lamp the illumination of which is provided by a control circuit which is triggered from the modulation frequency output of the receiver. If, therefore, with such an automatic radio direction finder, the polarization of an incoming signal changes away from the predetermined intended polarization, the signal strength usually falls away due to the polarization protection of the aerial but the A.G.C. system of the receiver operates to increase the gain so that the strength indicator will indicate satisfactory reception conditions for bearing observation despite the fact that the incoming signals are of wrong polarization. Large bearing errors may result. The term "polarization protection" is used to indicate the difference in response of the aerial to signals of desired and undesired polarization.

In order to avoid bearing errors from this cause it has been proposed to provide a radio direction finder having a direction determining aerial of predetermined plane polarization with an auxiliary aerial polarized at right angles to the direction determining aerial to use signals exceeding a predetermined strength and received on the auxiliary aerial, for rendering the direction finder inoperative. The auxiliary aerial, however, serves no other purpose than that of preventing operation of the direction finder in the presence of strong signals of wrong polarization. The present invention also utilizes the principle of preventing operation of a direction finder in the presence of strong signals of wrong polarization by means of an auxiliary aerial but uses an auxiliary aerial of such a nature and so arranges the apparatus as also to provide a communication channel free of modulation due to the direction finder.

According to this invention an automatic radio direction finder comprises a polarized directional aerial, a receiver equipped with A.G.C. and fed from said aerial, a strength indicator for indicating whether or not the received signal strength is sufficient for reliable directional observation, an auxiliary omnidirectional, all polarization aerial or its equivalent means for employing signals received upon said auxiliary aerial to exercise A.G.C. to keep the receiver gain low when the directional aerial picks up a signal of polarization substantially different from that for which the directional aerial is designed, a source of locally generated oscillations of predetermined selectable frequency, a balanced modulator means for utilizing said oscillations to modulate by means of said modulator signals received upon the auxiliary omni-directional aerial, means for mixing the resulting modulated signals with signals picked up on the directional aerial, means for feeding the combined result to a single receiver having automatic gain control means for separating from the output of the receiver a band of frequencies including the locally generated oscillation component and adapted to carry speech frequencies, said band being outside the band used for direction finding purposes, means for utilizing the separated generated oscillation component to provide automatic gain control of said receiver, and means for receiving carried speech frequencies. In this way an important defect of known automatic direction finders employing a spinning radio-goniometer (or its electronic equivalent)—namely that the goniometer (or equivalent) introduces a low frequency modulation of speech frequency signals which are commonly received for monitoring and other purposes, with consequent serious loss of intelligibility is avoided since the goniometer (or equivalent) is no longer in the useful speech frequency channel.

The invention is illustrated in the accompanying block schematic drawing.

Referring to the drawing the arrangement therein disclosed comprises a directional aerial 1 designed for waves of predetermined polarization for example responsive to the vertical component of an incoming wave front and which may be of any structure suitable and usual for automatic radio direction finders. In addition to this aerial there is an omnidirectional aerial 2' which is an "all-polarization" omnidirectional aerial. Incoming signals on the aerial 2' are fed to a balanced modulator 7 where they are modulated to a depth of about 100% by locally generated oscillations from a local oscillator 8 whose frequency is above the normal audio frequency band. It may, for example, be 8 kc./s. The modulated output from unit 7 is fed over lead 9 to a mixer 10 where it is mixed with signals from the directional aerial 1. The combined output from the mixer 10 is fed to a receiver 3 which is represented as comprising a radio frequency amplifier RFA, heterodyne oscillator, mixer and intermediate frequency amplifier unit HMI and detector DT.

As will be appreciated the signals picked up on the aerial 2' will be of strength more or less independent of polarization and these signals modulated to about 100% by local oscillations from the local oscillator 8 are mixed in the mixer 10 with signals from the aerial 1 and the combined output fed to the receiver 3. The detected output from the detector DT is passed to a unit 5 which comprises a phase comparing circuit, direction indicator actuated thereby, and strength indicator for indicating whether or not the incoming signal strength is of a value sufficient for reliable directional observation, all as known and ordinarily employed in automatic direction finders. Output from the detector DT is also passed to a band pass filter 13 designed to pass the band of (say) 4 to 8 kc./s. Since the D.F. modulation intelligence will lie well below the lower limit of this band—a normal practical figure is 25 c./s.—it will not pass this filter and, of course, neither will the speech frequencies, also modulated at 25 c./s. by the spinning goniometer or its equivalent. The output from filter 13 feeds two channels. The first includes a filter-amplifier 11 selective to the frequency of the local oscillator 8 (8 kc./s. in the present example) which feeds a rectifier-smoother unit 12 providing A.G.C. voltage for the receiver 3. The second consists of a demodulator 14 which regains the speech frequencies carried on the 8 kc./s. oscillations and feeds via an audio amplifier 15 to the speech signals utilization means (not shown).

While we have described our invention in certain of its preferred embodiments, we realize that modifications may be made, and we desire that it be understood that no limitations upon our invention are intended other than may be imposed by the scope of the appended claims.

We claim:

1. An automatic radio direction finder comprising a polarized directional aerial, an auxiliary omni-directional, all polarization aerial, a source of locally generated oscillations of predetermined selectable frequency, a balanced modulator, means for utilizing said oscillations to modulate by means of said modulator signals received upon the auxiliary omni-directional aerial, means for mixing the resulting modulated signals with signals picked up on the directional aerial, a receiver, including a detector and having automatic gain control circuits, a strength indicator for indicating whether or not the received signal strength is sufficient for reliable directional observation, means for feeding the mixed signals to the receiver, means for separating from the output of the receiver a band of frequencies including the locally generated oscillation component and adapted to carry speech frequencies, said band being outside the band used for direction finding operation, means for utilizing the separated locally generated oscillation component to provide an output to operate said automatic gain control circuits, and means for recovering carried speech frequencies.

2. A radio direction finder as set forth in claim 1 wherein automatic gain control is effected in dependence upon the detected output from the receiver and the output from the said separated locally generated oscillation component utilization means fed in parallel.

References Cited in the file of this patent

UNITED STATES PATENTS

| | | |
|---|---|---|
| 1,814,813 | Alexanderson | July 14, 1931 |
| 1,892,221 | Runge | Dec. 27, 1932 |
| 1,916,358 | Bruce et al. | July 4, 1933 |
| 2,026,254 | Sandfort | Dec. 31, 1935 |
| 2,061,737 | Offenhauser | Nov. 24, 1936 |
| 2,062,906 | Hooven | Dec. 1, 1936 |
| 2,256,619 | Luck | Sept. 23, 1941 |

FOREIGN PATENTS

| | | |
|---|---|---|
| 496,217 | Great Britain | Nov. 25, 1938 |